(12) United States Patent
Walde et al.

(10) Patent No.: US 8,391,025 B2
(45) Date of Patent: Mar. 5, 2013

(54) PREEMPTIVE PROTECTION FOR A POWER CONVERTOR

(75) Inventors: Hendrik Walde, Fort Collins, CO (US); Daryl Frost, Windsor, CO (US)

(73) Assignee: Advanced Energy Industries, inc., Fort Collins, CO (US)

( * ) Notice: Subject to any disclaimer, the term of this patent is extended or adjusted under 35 U.S.C. 154(b) by 556 days.

(21) Appl. No.: 12/647,466

(22) Filed: Dec. 26, 2009

(65) Prior Publication Data

US 2010/0149843 A1 Jun. 17, 2010

Related U.S. Application Data

(63) Continuation-in-part of application No. 12/114,494, filed on May 2, 2008, now Pat. No. 7,791,912.

(60) Provisional application No. 61/141,141, filed on Dec. 29, 2008.

(51) Int. Cl.
  *H02M 7/53* (2006.01)
(52) U.S. Cl. .......................... 363/16; 323/319; 363/56.01
(58) Field of Classification Search .................. 363/16, 363/50, 55, 56.01, 56.02; 323/235, 319
See application file for complete search history.

(56) References Cited

U.S. PATENT DOCUMENTS

| | | | |
|---|---|---|---|
| 4,088,018 A | 5/1978 | Anderson | |
| 4,191,992 A | 3/1980 | Johannessen | |
| 4,304,407 A | 12/1981 | Ashe | |
| 4,323,329 A | 4/1982 | Chlad | |
| 4,469,719 A | 9/1984 | Martin | |
| 4,737,169 A | 4/1988 | Bossard | |
| 5,165,049 A * | 11/1992 | Rotman | 323/212 |
| 5,325,258 A | 6/1994 | Choi et al. | |
| 5,535,906 A | 7/1996 | Drummond | |
| 5,576,939 A | 11/1996 | Drummond | |
| 5,596,465 A | 1/1997 | Honda et al. | |
| 5,627,738 A | 5/1997 | Lubomirsky et al. | |
| 5,781,418 A * | 7/1998 | Chang et al. | 363/16 |
| 5,818,670 A | 10/1998 | Ahn | |
| 5,930,132 A | 7/1999 | Watanabe et al. | |
| 6,016,257 A | 1/2000 | Chang et al. | |
| 6,256,179 B1 | 7/2001 | Yamada et al. | |
| 6,618,276 B2 | 9/2003 | Bennett | |
| 6,718,272 B1 | 4/2004 | Fisk, II et al. | |
| 6,821,477 B2 | 11/2004 | Saitoh et al. | |
| 6,884,467 B2 | 4/2005 | Walker et al. | |
| 6,884,634 B2 | 4/2005 | Suzuki et al. | |
| 6,885,567 B2 | 4/2005 | Lincoln et al. | |
| 6,909,620 B2 | 6/2005 | Park et al. | |

(Continued)

FOREIGN PATENT DOCUMENTS

JP 07264876 A 10/1995

OTHER PUBLICATIONS

Lindner, Nora, "International Preliminary Report on Patentability re Application No. PCT/US09/042576", Nov. 11, 2010, Published in: WO.

(Continued)

*Primary Examiner* — Harry Behm
(74) *Attorney, Agent, or Firm* — Neugeboren O'Dowd PC

(57) ABSTRACT

Among many embodiments, a power conversion apparatus and a method for converting power are disclosed. The power conversion apparatus may include switching components configured to create an alternating current; a preemptive detector arranged and configured to provide, in advance of the alternating current reaching a zero-crossing, a control signal responsive to the alternating electrical current approaching the zero-crossing; and a controller configured, at least in part, to change a state of the switching components before the zero crossing, in response to the control signal.

10 Claims, 14 Drawing Sheets

U.S. PATENT DOCUMENTS

| | | |
|---|---|---|
| 7,019,507 B1 | 3/2006 | Dittmer et al. |
| 7,031,128 B2 | 4/2006 | Nam |
| 7,081,598 B2 | 7/2006 | Ilic et al. |
| 7,088,594 B2 * | 8/2006 | Sase et al. .................. 363/16 |
| 7,105,075 B2 | 9/2006 | Ilic et al. |
| 7,113,379 B2 | 9/2006 | Matsumoto |
| 7,180,758 B2 | 2/2007 | Lincoln et al. |
| 7,303,982 B2 | 12/2007 | Collins et al. |
| 7,304,438 B2 | 12/2007 | Kishinevsky |
| 7,305,311 B2 | 12/2007 | van Zyl |
| 7,320,734 B2 | 1/2008 | Collins et al. |
| 7,353,771 B2 | 4/2008 | Millner et al. |
| 7,397,676 B2 | 7/2008 | Lincoln et al. |
| 7,791,912 B2 | 9/2010 | Walde |
| 2001/0021422 A1 | 9/2001 | Yamakoshi et al. |
| 2004/0219874 A1 | 11/2004 | Karadia |
| 2005/0219875 A1 | 10/2005 | Millner et al. |
| 2006/0054601 A1 | 3/2006 | Ilic et al. |
| 2006/0215064 A1 * | 9/2006 | Dawson et al. ............ 348/730 |
| 2006/0241879 A1 | 10/2006 | van Zyl |
| 2007/0295272 A1 | 12/2007 | Padhi et al. |
| 2008/0011424 A1 | 1/2008 | Yin et al. |
| 2008/0020574 A1 | 1/2008 | Marakhtanov et al. |
| 2008/0026597 A1 | 1/2008 | Munro et al. |
| 2008/0029484 A1 | 2/2008 | Park et al. |
| 2009/0273954 A1 | 11/2009 | Walde |

OTHER PUBLICATIONS

Wikipedia, "Insulated Gate Bipolar Transistor", p. 6, Publisher: Webpage downloaded Feb. 28, 2012 from http://en.wikipedia.org/w/index.php?oldid=475368050, Published in: US.

Wittmann-Regis, Agnes, "International Preliminary Report on Patentability re Application PCT/US2009/069575", Jul. 7, 2011, p. 8 Published in: CH.

Wikipedia, "Power MOSFET", p. 9, Publisher: Webpage downloaded Jan. 15, 2008 from http://en.wikipedia.org/wiki/Power_MOSFET, Published in: US.

Wikipedia, "Schottky Diode", p. 2 Publisher: Webpage downloaded Jan. 15, 2008 from http://en.wikipedia.org/wiki/Schottky_diode, Published in: US.

Wee, Jae Woo, "PCT International Search Report re Application No. PCT/US09/042576", Dec. 18, 2009, Published in: PCT.

Dixit, Arpit, "PCT International Search Report re Application No. PCT/US09/069575", , Published in: PCT, Mailing date Mar. 29, 2010; 12 pages.

* cited by examiner

PREEMPTIVE PROTECTION FOR A POWER CONVERTOR

PRIORITY

This application is a continuation-in-part of U.S. application Ser. No. 12/114,494 entitled Protection Method, System, and Apparatus for a Power Converter, filed May 2, 2008. This application also claims priority to U.S. Provisional Application No. 61/141,141 entitled Preemptive Protection for a Power Converter, filed Dec. 29, 2008.

BACKGROUND OF THE INVENTION

This invention relates generally to protection for a power converter. More particularly, the invention relates to protecting switching components (e.g., MOSFETs (metal oxide semiconductor field effect transistors) or IGBTs (insulated-gate bipolar transistors)) of a power converter.

One particular use of a DC/AC (direct current/alternating current) power converter, which is susceptible to a below resonant condition, is in a current generator to drive current for plasma generation in a plasma chamber processing thin films. The resonance in this environment is the pole resonance of a transfer function of a circuit made up of an output transformer of the power converter, a capacitor in series with the primary of the output transformer and the load impedance driven by the output transformer. The resonant frequency is determined by the load impedance, the leakage inductance of the transformer, and the capacitance of the capacitor.

In the DC/AC power converter two MOSFETs are connected in series. The primary of an output transformer is connected at a common node between the two MOSFETs so the pair of MOSFETs can push or pull current through the primary of the transformer during alternate ON/OFF cycles. However, during a below resonant frequency condition a MOSFET may be gated ON while the voltage across the MOSFET is high. Also, the paired MOSFET will at the same time be conducting current through its intrinsic diode. When the MOSFET biased with a high voltage turns on, it will cause the intrinsic diode in the paired MOSFET to snap off. This is referred to as a hard-driven condition for the paired MOSFET. Such a hard-driven condition can cause a MOSFET to fail over time.

In the past to prevent both MOSFETs from being hard-driven, four diodes have been added to the power converter. For each MOSFET there is an additional diode in parallel with the intrinsic diode of the MOSFET. This additional diode carries the reverse current that would otherwise be carried by the intrinsic diode of the MOSFET. Also for each MOSFET, a Schottky diode is added at the source connection to limit the reverse current through the intrinsic diode of the MOSFET. This solution to the hard-driven problem is expensive. In high power environments the high-current diodes added to protect the MOSFETs are expensive. Also, the additional high-current conductive paths are expensive because of the amount of precious metal used in the paths.

SUMMARY OF THE INVENTION

In some embodiments, the invention may be characterized as a power conversion apparatus that includes switching components configured to create an alternating current; a preemptive detector arranged and configured to provide, in advance of the alternating current reaching a zero-crossing, a control signal responsive to the alternating electrical current approaching the zero-crossing; and a controller configured, at least in part, to change a state of the switching components before the zero crossing, in response to the control signal.

In accordance with other aspects, the present invention relates to a method for converting power that includes creating an alternating current with at least two switches; producing a current signal that is indicative of the alternating current; shifting a phase of the current signal so as to generate a phase-shifted-current-signal that has zero-crossings that occur before zero-crossings of the current signal; and altering, responsive to the phase-shifted-current-signal approaching a zero-crossing, a state of the switches before the alternating current reaches a zero-crossing.

These and various other features as well as advantages, which characterize the present invention, will be apparent from a reading of the following detailed description and a review of the associated drawings.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION OF THE INVENTION

Figure 1:
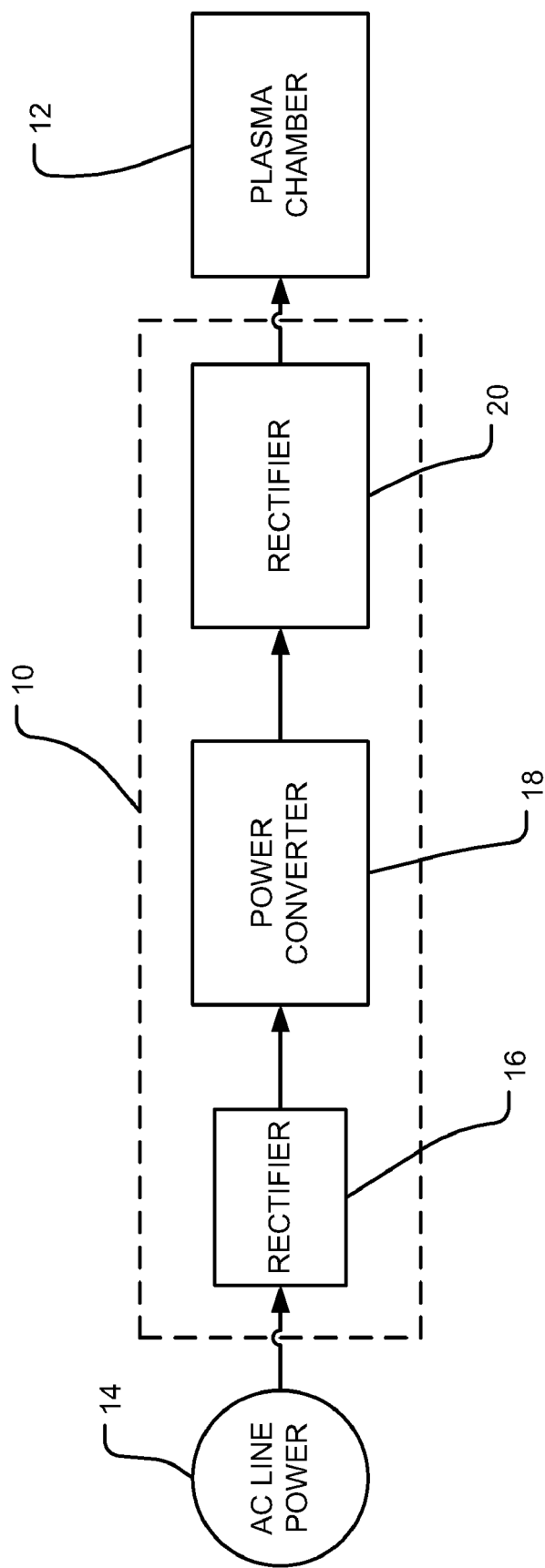
FIG. 1 shows one embodiment of the invention used to generate direct current drive for a single cathode plasma chamber or alternate current drive for a dual cathode plasma chamber.

In the system of FIG. 1, a power generator 10 uses one or more embodiments of a power converter. In many embodiments, the power converter 18 will generate AC (alternating current) power from DC (direct current) power to drive a plasma chamber 12. A line AC power source 14 provides power to the generator 10. Depending on the power requirements of the power converter application, the AC power source 14 provides AC voltage in a range from less than 10 volts to several hundred volts.

Power generator 10 includes a rectifier 16, power converter 18 and optional rectifier 20. Rectifier 16 converts AC power from line power source 14 into DC power supplied to power converter 18. This DC power from rectifier 16 is not sufficiently stable to be directly applied to the plasma chamber 12. Power converter 18 receives the DC power from rectifier 16 and generates a very clean and stable AC power. Power converters are also referred to as inverters. The structure and operation of power converter 18 is described hereinafter with reference to FIG. 2. The AC power from the power converter 18 is applied directly to the plasma chamber 12 if the chamber is a dual cathode chamber operating on AC power. If the plasma chamber 12 is a single cathode chamber, the AC power from power converter 18 is passed to rectifier 20. Rectifier 20 converts the stable AC power from power converter 18 into a stable DC power that may be used to drive a single cathode plasma chamber 12.

Figure 2:
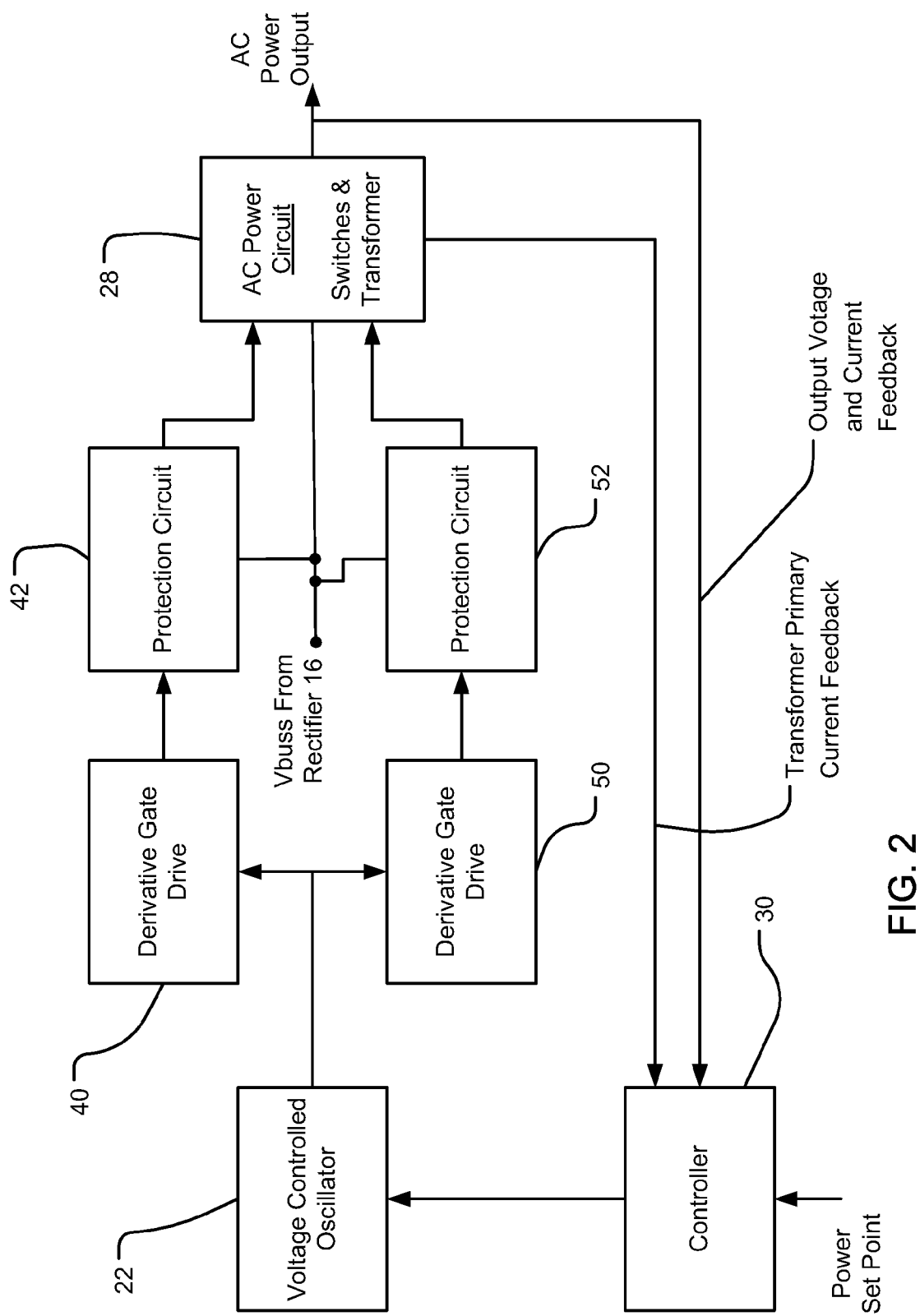
FIG. 2 shows a system diagram of one embodiment of the power converter 18 in FIG. 1.

FIG. 2 is a system diagram of the power converter 18 of FIG. 1. Voltage controlled oscillator (VCO) 22 provides a square wave at a controlled frequency to derivative gate drives 40 and 50. Derivative gate drives 40 and 50 derive ON and OFF gate pulses from this controlled frequency. Derivative gate drive 40 generates ON and OFF gate pulses for a first power switch in AC power circuit 28. Derivative gate drive 50 generates ON and OFF gate pulses for a second power switch in AC power circuit 28. The power switches conduct current in alternate directions through the primary winding of an output transformer to generate the AC power output at the secondary winding of the output transformer. The power switches in many embodiments are MOSFETs or power MOSFETs.

The square wave signal from VCO 22 controls the timing of ON and OFF gate pulses to enable the gate of each MOSFET. The square wave signal is operated on by gate drive logic located inside the derivative gate drives 40 and 50 to produce these gate pulses. Each gate pulse has a length substantially equal to one half of the ringing period of the wiring inductance to and the gate capacitance of the MOSFET. A gate pulse length of one half ringing period is preferable to reduce gate drive power. In switching the pair of MOSFETS in the power circuit 28, a first MOSFET will receive an ON gate pulse and a second MOSFET will receive an OFF gate pulse derived from the rising edge of the square wave. Conversely, the second MOSFET will receive an ON gate pulse and the first MOSFET will receive an OFF gate pulse derived from the falling edge of the square wave. The ON gate pulse is started a "dead time" or delay time after the OFF gate pulse. The dead time prevents cross-conduction between the two MOSFETs, i.e. both MOSFETs being ON at the same time.

DC voltage, $V_{BUSS}$, is supplied from rectifier 16 to AC power circuit 28 and protection circuits 42 and 52. This voltage $V_{BUSS}$ from rectifier 16 is a bias voltage for the switches in the power circuit 28 and is the DC power to be converted to AC power. As described above the switches in many embodiments are a pair of MOSFETs, but depending on the power application in alternative embodiments, the switches might be IGBTs. Each MOSFET of the pair of MOSFETs in power circuit 28 is gated by the ON and OFF gate pulses from its associated derivative gate drive 40 or 50. To protect the MOSFETs from being hard-driven during a below resonant frequency condition, protection circuits 42 and 52 can block, intercept, short out, disable, or otherwise prevent the ON gate pulses generated by gate drives 40 and 50 respectively from reaching the gate of their associated MOSFET. One embodiment for power circuit 28 and protection circuits 42 and 52 is illustrated in FIG. 3 described hereinafter.

In FIG. 2 controller 30 receives voltage and current feedback from the output of AC power circuit 28, and in response to this feedback controls the frequency of the square wave signal generated by voltage-controlled oscillator (VCO) 22. Controller 30 compares the power of the AC power output signal to a power set point input to the controller and adjusts the controlled frequency of VCO 22. In the case of an above resonance condition, controller 30 increases the controlled frequency if the power is too high. Likewise controller 30 decreases the controlled frequency if the power is too low. Controller 30 may be implemented as an analog signal controller with hard-wired circuits or it may be implemented using a digital signal processor programmed with software using a gain lookup table to provide the control signals to VCO 22.

Controller 30 also receives current feedback from the primary winding of the output transformer. This primary winding current is used along with the VCO controlled frequency in a phase/frequency detector to detect below resonance operating condition. When the below resonance condition is detected, controller 30 increases the controlled frequency from VCO 22 to return the power converter to above resonance condition.

Figure 3:
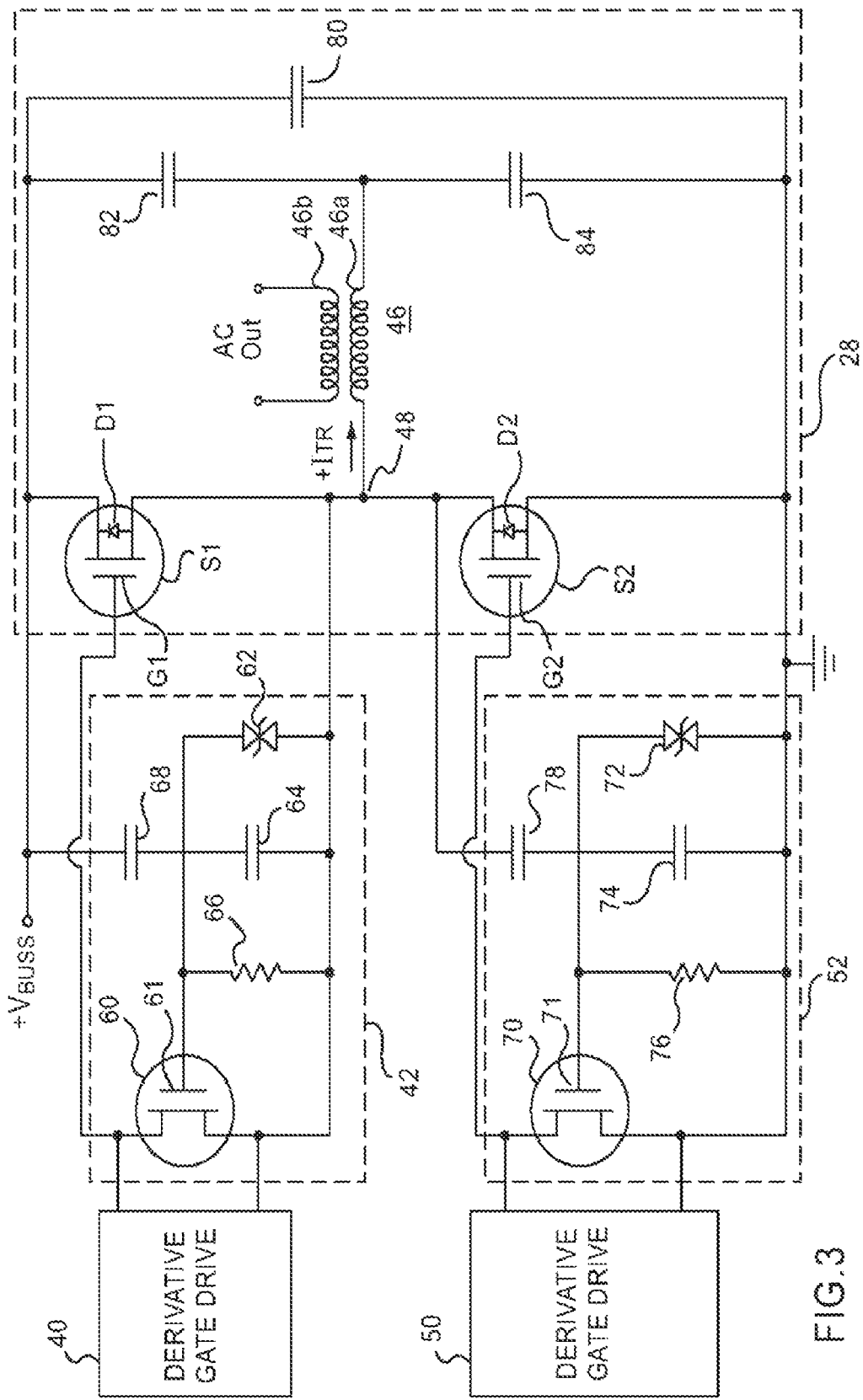
FIG. 3 shows a circuit diagram of the AC power circuit 28 of FIG. 2 and the protection circuits 42 and 52 of FIG. 2.

FIG. 3 shows one embodiment for the protection circuits 42 and 52 and for AC power circuit 28 of FIG. 2. In AC power circuit 28 in FIG. 3, power switch S1 and power switch S2 are MOSFETs connected in series at node 48. The drain of power switch S1 is connected to the $+V_{BUSS}$ DC voltage, while the source of power switch S2 is connected to ground. A capacitor 80 is connected across the switches from $+V_{BUSS}$ to ground. The purpose of capacitor 80 is to stabilize the $+V_{BUSS}$ voltage by providing a low impedance path for any high frequency noise or ripple on the $+V_{BUSS}$ voltage. Primary winding 46a of output transformer 46 is connected between node 48 and capacitors 82 and 84. Capacitor 82 provides a circuit path from the primary winding to $+V_{BUSS}$, and capacitor 84 provides a circuit path from the primary winding to ground. The terminals of output winding 46b of transformer 46 are the AC power output connections for AC power circuit 28.

Figure 4:
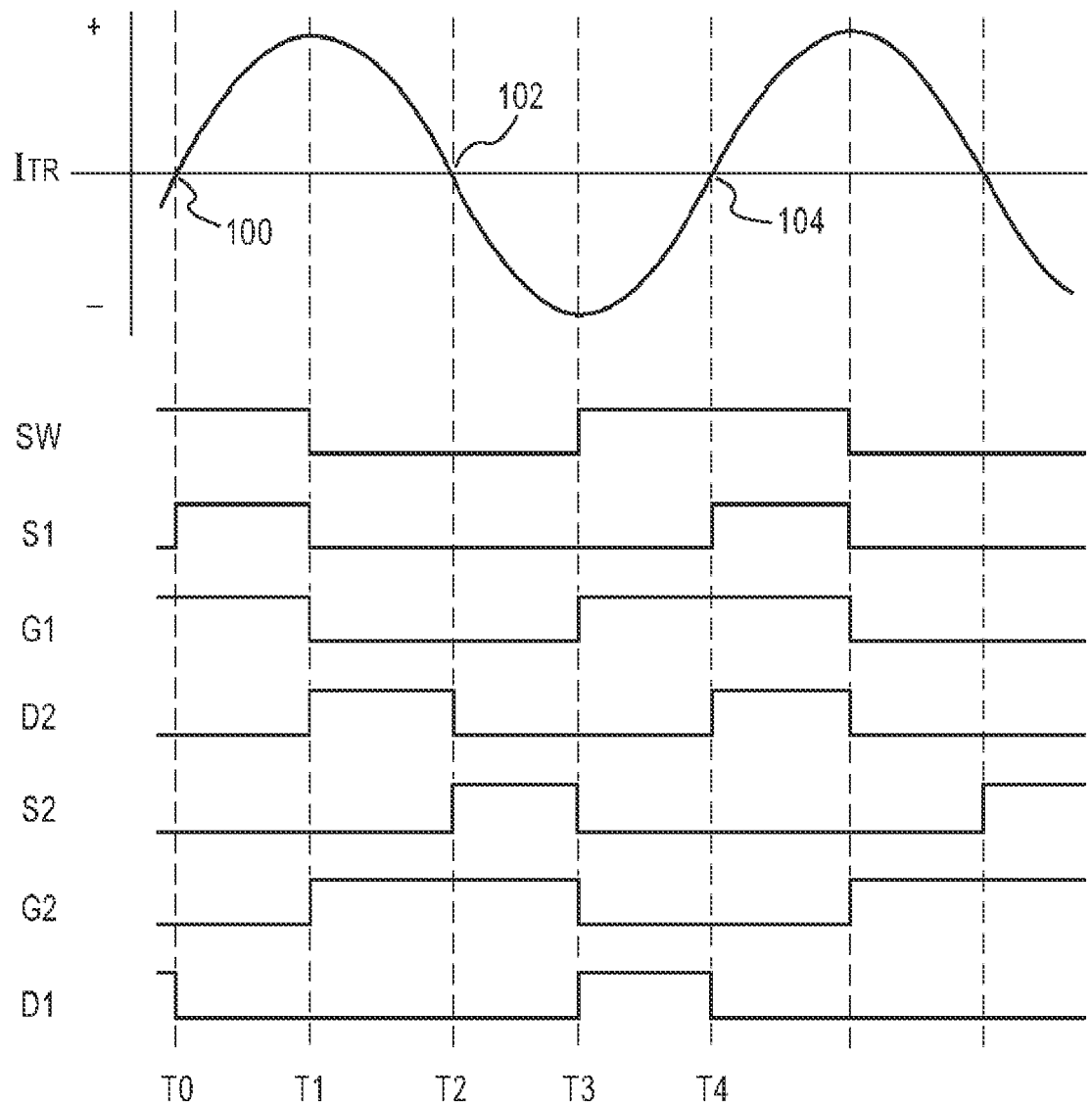
FIG. 4 illustrates the current through the primary of transformer 46 in FIG. 3 along with the timing of the switching of the power switches S1 and S2, their intrinsic diodes D1 and D2 during an above resonance condition.
Figure 5:
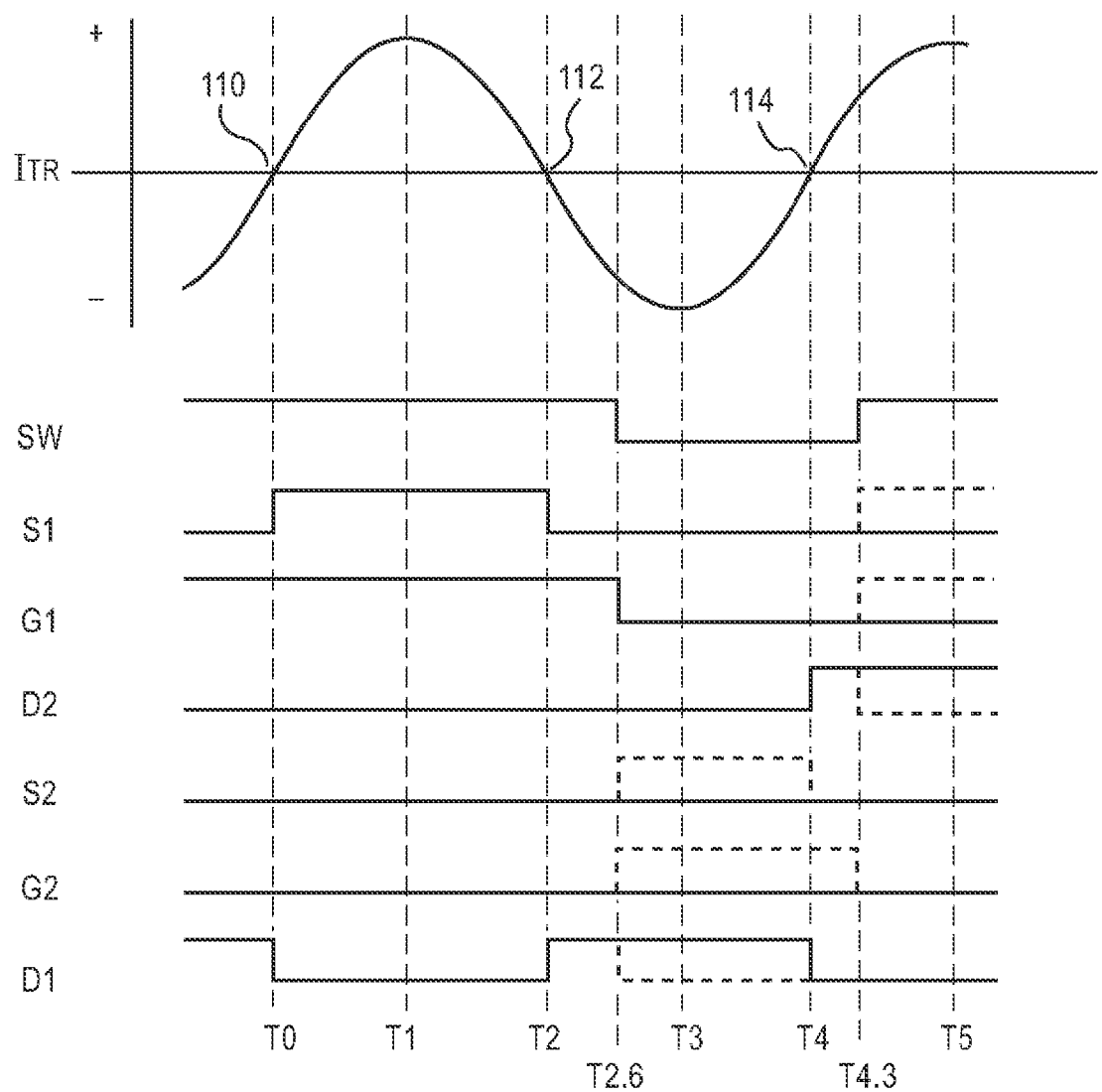
FIG. 5 illustrates the current through the primary of transformer 46 in FIG. 3 along with the timing of the switching of the power switches S1 and S2, their intrinsic diodes D1 and D2 during a below resonance condition.

The operation of the circuits in FIG. 3 are described with reference to FIGS. 4 and 5 which show transformer current $I_{TR}$ and the ON/OFF timing of switch states, gate enable states, and intrinsic diode conductive states of MOSFET switches S1 and S2 in FIG. 3. FIG. 4 illustrates the timing during above resonance condition, and FIG. 5 illustrates the timing during below resonance condition. The transformer current $I_{TR}$ is the current through the primary winding of output transformer 46 in FIG. 3.

For ease of cross-reference between FIG. 3 and FIG. 4 or FIG. 5, power switch S1 in FIG. 3 and its ON/OFF state of conductivity in FIGS. 4 and 5 are labeled S1. Gate G1 of power switch S1 and its ON/OFF state representing gate enable/gate disable are labeled G1. Likewise intrinsic diode D1 of power switch S1 and its ON/OFF state of conductivity are labeled D1. In the same manner power switch S2, gate G2 and intrinsic diode D2 in FIG. 3 and their states in FIGS. 4 and 5 are labeled S2, G2, and D2, respectively. In FIGS. 4 and 5, an up level for MOSFET power switch S1 or S2 means the source to drain of that MOSFET switch in FIG. 3 is conducting, i.e. the state of the switch is ON. A down level for S1 or S2 means the source to drain of the associated MOSFET is non-conducting, and the state of the switch is OFF. In FIGS. 4 and 5, an up level for the state of D1 or D2 means the intrinsic diode in that MOSFET switch is conducting reverse current through the MOSFET, and the intrinsic diode is ON. A down level for D1 or D2 means the state of the intrinsic diode in the associated MOSFET switch is non-conducting, and the intrinsic diode is OFF. In FIGS. 4 and 5, an up level G1 or G2 means the state of the gate of the associated MOSFET switch is enabled i.e. the gate is ON. A down level for G1 or G2 means the state of the gate of the associated MOSFET switch is disabled, i.e. the gate is OFF.

In the operation of switches S1 and S2 in FIG. 3 as illustrated in FIG. 4, a gate is enabled or turned ON by an ON gate pulse derived by gate drives from the rising or falling edge of square wave SW (FIGS. 4 and 5) from VCO 22 (FIG. 2). The state of the gate remains ON or enabled until the next rising or falling edge of square wave SW when the gate is turned OFF by an OFF gate pulse. The duration of an ON or OFF gate pulse ranges typically from several hundred nanoseconds to a few microseconds while the period of the square wave from VCO 22 (FIG. 2) ranges from several hundred microseconds to a few milliseconds. Switches S1 and S2 are conducting when their respective gates G1 and G2 are ON, i.e. enabled, and current is flowing from source to drain. For example, even though G1 is ON, power switch S1 is not ON until current is flowing in the forward direction (source to drain) through the switch. On the other hand, as soon as G1 is disabled by an OFF gate pulse, S1 turns OFF even if it was conducting current.

Above Resonance Condition

During an above resonance condition the ON gate pulses are early relative to the transformer current ITR zero crossovers. Referring now to FIGS. 3 and 4, in an above resonance condition MOSFET power switch S1 turns ON at time T0; gate G1 of power switch S1 has been previously enabled and is an ON state so S1 turns ON as the current ITR goes through the zero current crossover 100 and goes positive. Positive transformer current ITR through the primary of transformer 46 is from the common node 48 towards primary winding 46a. The current flow is from +VBUSS through the drain to source of power switch S1, primary winding 46a and capacitor 84 to ground. At time T1, an OFF gate pulse from derivative gate 40 turns power switch S1 OFF by changing the state of gate G1 from enabled to disabled. Transformer current ITR has reached its maximum positive value before time T1 and starts to increase the voltage across capacitor 82 because controller 30 (FIG. 2) is controlling AC power output. Since S1 is OFF, the current ITR is no longer provided through S1 so winding 46a will draw current through intrinsic diode D2. Accordingly at time T1, intrinsic diode D2 of power switch S2 turns ON providing a reverse current flow through S2. The current flow is now from ground through intrinsic diode D2, primary winding 46a and capacitor 84. Further at time T1 plus the dead time delay, an ON pulse from derivative gate drive 50 enables gate G2 of power switch S2. Since the current ITR is positive and intrinsic diode D2 is conducting a reverse current flow through S2, the voltage across power switch S2 from source to drain is near zero. Accordingly, even though G2 is enabled, S2 does not switch ON.

At time T2 when transformer current $I_{TR}$ goes through zero crossover 102 and becomes negative, intrinsic diode D2 becomes nonconducting. Power switch S2, which has already been gate enabled at time T1, turns ON at time T2 to conduct current $I_{TR}$. The current flow through S2 is now a forward current flow from source to drain. The negative transformer current $I_{TR}$ flows from the primary winding 46a of transformer 46 toward the common node 48. The current flow is from +$V_{BUSS}$ through capacitor 82, primary winding 46a, and power switch S2 to ground.

At time T3, derivative gate drive 50 generates an OFF gate pulse that disables gate G2 of power switch S2, and S2 turns OFF. Current $I_{TR}$ has reached its maximum negative value and starts to decrease in magnitude. Also at time T3, intrinsic diode D1 of power switch S1 turns ON to satisfy the negative current demand of primary winding 46a. The current flow is now from ground through capacitor 84, primary winding 46a and intrinsic diode D1. Further at time T3 plus the dead time, an ON gate pulse from derivative gate drive 40 enables gate G1 of power switch S1. Since intrinsic diode D1 is conducting reverse current through S1, and the voltage across power switch S1 from source to drain is near zero, S1 does not switch ON. At time T4, when the current $I_{TR}$ goes through zero crossover 104, power switch S1 is turns ON, and intrinsic diode D1 becomes nonconducting. This cycle repeats as long as the power converter remains in an above resonance condition.

Below Resonance Condition

A below resonance condition is caused by the change of load impedance attached to the output winding 46b of transformer 46 in FIG. 3. During a below resonance condition the ON gate pulses are late relative to the transformer current $I_{TR}$ zero crossovers. Since the ON and OFF gate pulses are derived from the VCO square wave, the controlled frequency of VCO 22 (FIG. 2) must be increased. While this adjustment is being made by controller 30 (FIG. 2) the protection circuits 42 and 52 protect the switches S1 and S2 from being hard-driven.

Referring now to FIG. 3 and FIG. 5, switches S1 and S2 and derivative gate drives 40 and 50 before time T0 are operating during an above resonant condition. At time T0, Gate G1 is already enabled, intrinsic diode D1 turns OFF because the transformer current $I_{TR}$ goes from negative to positive at zero crossover 110. Power switch S1 turns ON to conduct the positive current $I_{TR}$. After time T0, circuit operations enter a period of below resonance condition. The falling edge of square wave SW, which would normally occur at time T1, does not occur until time T2.6. Therefore, the OFF gate pulse for power switch S1 does not occur until time T2.6, and also the ON gate pulse for power switch S2 does not occur until T2.6 at a dead time after the OFF gate pulse. These gate pulses occurring after time T2, when current $I_{TR}$ zero crossover 112 occurs, indicate the switches and derivative gate drives are now operating during a below resonant condition for the power converter.

During this below resonant condition power switch S1 stays ON until the current $I_{TR}$ goes negative through zero crossover 112. From time T0 to T2 the current flow is from +$V_{BUSS}$ through S1, primary winding 46a and capacitor 84. After time T2, where the transformer current $I_{TR}$ goes through zero crossover 112, intrinsic diode D1 turns ON to satisfy the negative current flow demanded by the inductance of transformer 46. The voltage across power switch S1 is substantially zero, and S1 turns OFF while intrinsic diode D1 satisfies the reverse current flow through S1. The voltage at node 48 approaches +$V_{BUSS}$, and now the current flow is from ground through capacitor 84, primary winding 46a and intrinsic diode D1 in power switch S1.

At time T2.6 there is a falling edge of square wave SW from VCO 22 (FIG. 2), and derivative gate drive 40 generates an OFF gate pulse for power switch S1, and derivative gate drive 50 generates an ON gate pulse for power switch S2. The OFF gate pulse drops the gate enabled state of gate G1 to OFF. This has no effect since power switch S1 turned OFF at time T0. However, the ON gate pulse from derivative gate drive 50, if allowed to reach power switch S2, would create a hard-recovery of intrinsic diode D1. Since all of the current $I_{TR}$ through D1 would switch to S2, intrinsic diode D1 would snap off. Also, the large voltage change across power switch S1 can damage the MOSFET power switch S1. To prevent this hard-driven event, protection circuit 52 prevents the ON gate pulse from reaching gate G2 of power switch S2.

In protection circuit 52, shorting switch 70 across the output of the derivative gate drive 50 can be turned ON to short out the ON gate pulse and thereby intercept, block, prevent or disable the ON gate pulse from reaching the gate of power switch S2. Shorting switch 70 may be a MOSFET, but this is not required. To initiate the blocking operation, the voltage at node 48 is divided across capacitors 78 and 74. When the voltage across capacitor 74 exceeds the threshold voltage $V_{TH}$ for shorting switch 70, shorting switch 70 will turn ON. While shorting switch 70 is ON, any gate pulses at the output of derivative gate drive 50 are shorted out. In particular shorting switch 70 is gated ON immediately when intrinsic diode D1 becomes conductive and stays ON until after the ON gate pulse from derivative gate drive 50 expires. The duration $T_d$ of the ON conductive state for shorting switch 70 is equal to the time for the voltage at the gate of shorting switch 70 to decay from a maximum voltage limited by bidirectional zener diode 72 to a voltage below $V_{TH}$ and is given by the expression:

$$T_d = R_{76}C[\ln(V_{MAX}/V_{TH})]$$

where:
$R_{76}$ is the resistance of resistor 76,
C is the capacitance of capacitor 74 in parallel with the gate capacitance of shorting switch 70 to ground,
"ln" is the natural log,
$V_{MAX}$ is the maximum voltage across bi-directional zener diode 72, and
$V_{TH}$ is the threshold voltage for the gate of shorting switch 70.

In protection circuit 52, the bidirectional zener diode 72 limits the voltage applied to gate 71 of shorting switch 70 to a safe range. Bidirectional zener diode 72 also sets the maximum voltage $V_{MAX}$ from which the gate signal decays to time out the shorting operation performed by switch 70. The threshold voltage $V_{TH}$ for gate 71 of shorting switch 70 and the circuit element values depend on the power requirements of the application. For example, if $V_{TH}$ is 5.6 volts and the $+V_{BUSS}$ is +620 volts, capacitor 78 could be 10 picofarads and capacitor 74 could be 1000 picofarads to provide a 6.2 volts across capacitor 74. However, the limit range for the bidirectional zener diode might be 5.0 volts to 6.0 volts. If the maximum voltage $V_{MAX}$ allowed by bidirectional zener diode 72 is 6.0 volts, the voltage applied to gate 71 to turn the gate ON will be 6.0 volts. The resistance for resistor 76 would be chosen so that gate 71 of shorting switch 70 is enabled from the time shorting switch 70 switches ON, when intrinsic diode D1 became conductive, until the ON gate pulse generated by derivative gate drive 50 expires.

After time T2.6 in FIG. 5 with protection circuit 52 disabling the ON gate pulse from derivative gate drive 50, gate G2 of power switch S2 is not enabled, power switch S2 remains OFF, and intrinsic diode D1 remains conductive (as indicated by solid lines in FIG. 5). This prevents power switch S1 from being hard-driven. If the protection circuit had not been operating, G2 would have been enabled, S2 would have switched ON, and intrinsic diode D1 would have snapped off (as indicated with the dashed lines in FIG. 5). Switch S1 would have been hard driven and damaged.

At time T4.0 transformer current $I_{TR}$ goes positive through zero crossover 114 while the current continues to ring through transformer 46 and capacitor 82 or 84. When the current goes positive, intrinsic diode D1 becomes non-conductive and intrinsic diode D2 becomes conductive. The square wave SW from VCO 22 has a rising edge at time T4.3 indicating the controlled frequency of the VCO is increasing. The rising edge triggers the generation of an OFF gate pulses from derivative gate drive 50 and an ON gate pulse from derivative gate drive 40, but these gate pulses are late relative to the current $I_{TR}$ zero crossing 114 at time T4. As a result, power switch S2 would be hard-driven if the ON gate pulse from derivative gate drive 40 were not shorted by shorting switch 60.

Protection circuit 42 operates in the same manner as just described above for protection circuit 52. In this situation where protection circuit 42 is active, intrinsic diode D2 is conducting. Therefore, node 48 is near ground i.e. substantially at zero volts, and the voltage across series-connected capacitors 68 and 64 is $+V_{BUSS}$. The voltage across capacitor 64 enables gate 61 of shorting switch 60, and shorting switch 60 shorts out the ON gate pulse from derivative gate drive 40.

At time T4.3 there is a rising edge of square wave SW from VCO 22 (FIG. 2), and derivative gate drive 50 generates an OFF gate pulse for power switch S2, and derivative gate drive 40 generates an ON gate pulse for power switch S1. The OFF gate pulse would drop the gate enabled state of gate G2 if it were in an enabled state. However gate G2 is not enabled since the ON gate pulse for power switch S2 at time T2.6 was blocked as described above. Switch S2 remains OFF. On the other hand, the ON gate pulse from derivative gate drive 40, if allowed to reach power switch S1, would create a hard-recovery of intrinsic diode D2. Since all of the transformer current $I_{TR}$ through D2 would switch to S1, intrinsic diode D2 would snap off. Also, the large voltage change across power switch S2 can also damage that MOSFET power switch S2. To prevent this hard-driven event, protection circuit 42 prevents the ON gate pulse from reaching gate G1 of power switch S1.

In protection circuit 42, shorting switch 60 across the output of the derivative gate drive 40 is turned ON to short out the ON gate pulse and thereby intercept, block, prevent or disable the ON gate pulse from reaching the gate of power switch S1. To accomplish this, the $+V_{BUSS}$ voltage across power switch S1 is divided across capacitors 68 and 64. When the voltage across capacitor 64 exceeds the threshold voltage $V_{TH}$ of gate 61 of shorting switch 60, shorting switch 60 will turn ON. While shorting switch 60 is ON, any gate pulses at the output of derivative gate drive 40 are shorted out. In particular shorting switch 60 is gated ON from the time intrinsic diode D2 becomes conductive until after the ON gate pulse from derivative gate drive 40 expires.

The operation of elements in protection circuit 42 is the same as their counterpart elements in protection circuit 52. Likewise the exemplary element values and voltages across the elements are the same in both protection circuits.

After time T4.3 in FIG. 5 with protection circuit 42 intercepting the ON gate pulse from derivative gate drive 40, gate G1 of power switch S1 is not enabled, power switch S1 remains OFF, and intrinsic diode D2 remains conductive (as indicated by solid lines in FIG. 5). This prevents power switch S2 from being hard-driven. If the protection circuit had not been operating, G1 would have been enabled, S1 would have switched ON, and intrinsic diode D2 would have snapped off (as indicated with the dashed lines in FIG. 5). Switch S2 would have been hard driven.

Other Embodiments

In another embodiment (not shown), shorting switches 60 and 70 in FIG. 3 could have been connected as MOSFET opening switches to only one output lead from their associated derivative gate drive. For example, an opening switch would be connected either between a positive output of the derivative gate drive and gates G1,G2 of switches S1,S2 or between a negative output of the derivative gate drive and ground. In this embodiment an opening switch would be held open to block an ON gate pulse from reaching gates G1,G2 of a switches S1,S2. The conductivity pattern of opening switches in this embodiment is the converse of the shorting switches in the embodiment of FIG. 3 as described above.

In yet another embodiment, a protection circuit would pass a disable signal back to its associated derivative gate drive. The disable signal would disable the generation of the ON gate pulse in the derivative gate drive. The timing and duration of the disable signal would be the same as the shorting interval that shorting switch 60 or 70 is ON as described in the embodiment of FIG. 3.

Figure 6:
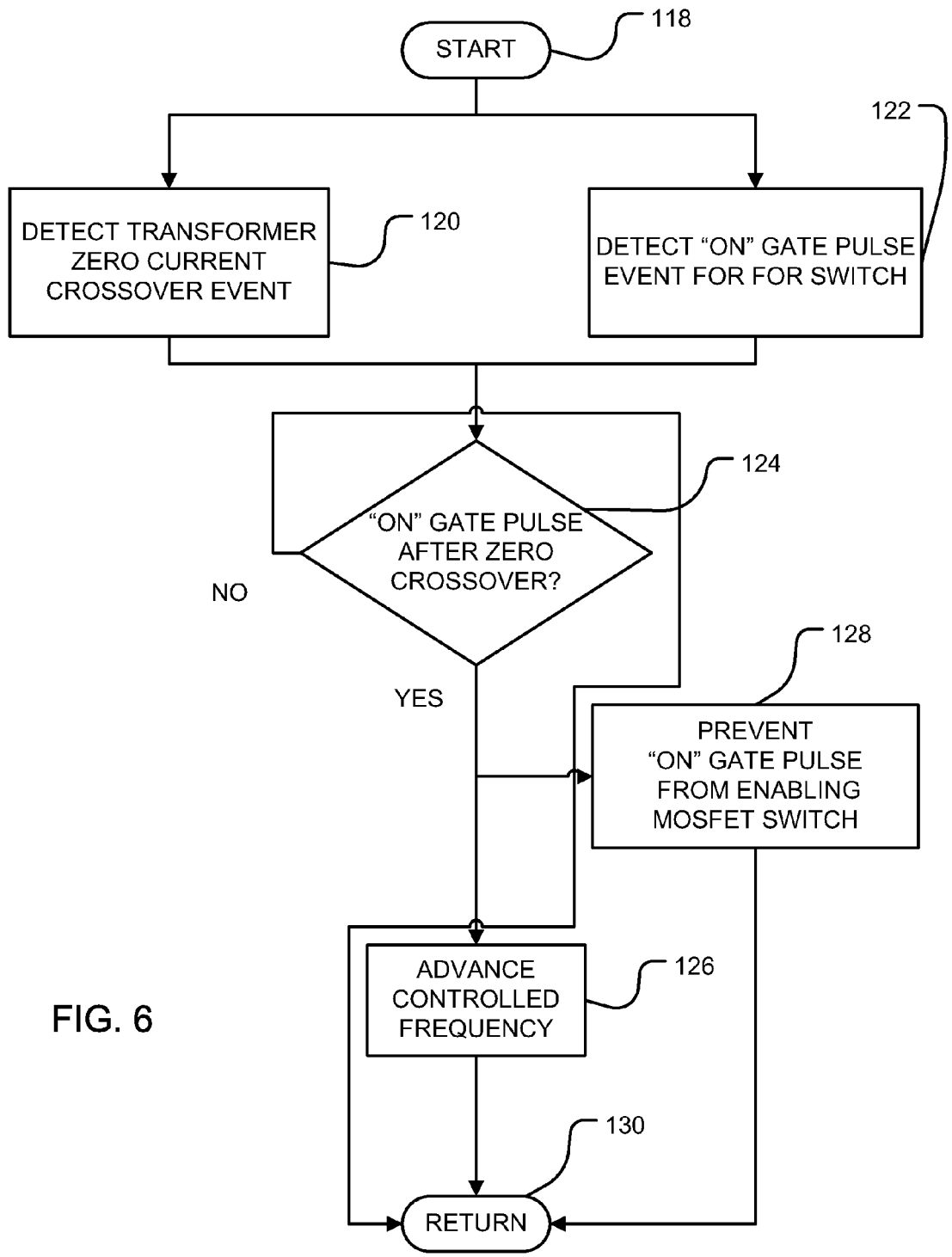
FIG. 6 shows a method for recovering a power converter from a below resonance condition.

In still another embodiment of the invention, FIG. 6 shows a method for protecting switches S1 and S2 in AC power circuit 28 (FIG. 3) and for adjusting the controlled frequency from the VCO 22 (FIG. 2). In the initial operations after START connector 118 of the method, two events are detected. Zero crossover event operation 120 detects when the transformer current $I_{TR}$ crosses through zero, i.e. the current changes direction through the primary winding of the transformer. As described above, points 100, 102 and 104 of the $I_{TR}$ current waveform in FIG. 4 and points 110, 112 and 114 of the $I_{TR}$ current waveform in FIG. 5 are zero crossover events. An ON gate pulse event operation 122 detects the generation of ON gate pulses for the pair of switches S1 and S2. As described above ON gate pulses are derived from the rising edge or falling edge of the square wave SW from VCO 22.

Gate Pulse/Crossover test operation 124 compares the timing of a ON gate pulse event against the timing of current $I_{TR}$ zero crossover event. The ON gate pulse event being tested is the event generating an ON gate pulse for a power switch S1 or S2 that is presently non-conducting or OFF. If the ON gate pulse event is before the current $I_{TR}$ zero crossover, the operation flow will branch NO to RETURN connector 130. If the ON gate pulse event is after the zero crossover event, the operation flow branches YES to advance operation 126 and prevent module 128.

Advance operation 126 increases the controlled frequency of the square wave SW. Increasing the controlled frequency of the square wave SW advances the timing of the ON and gate pulses. Accordingly, the ON gate pulses will advance until they occur prior to the $I_{TR}$ zero crossover points. As described above, this moves the condition of the AC power circuit 28 (FIG. 2) to an above resonance condition.

Prevent module 128 blocks the ON gate pulse from reaching the gate of the power switch that is OFF and paired with a power switch that is reverse-conducting. The reverse-conducting switch in this situation is the switch whose intrinsic diode is conducting. This reverse-conducting switch is also the switch that would be hard-driven and damaged if its paired power switch turned on. The operational flows of alternative embodiments of the prevent operation 128 are shown in FIGS. 7 and 8.

Figure 7:
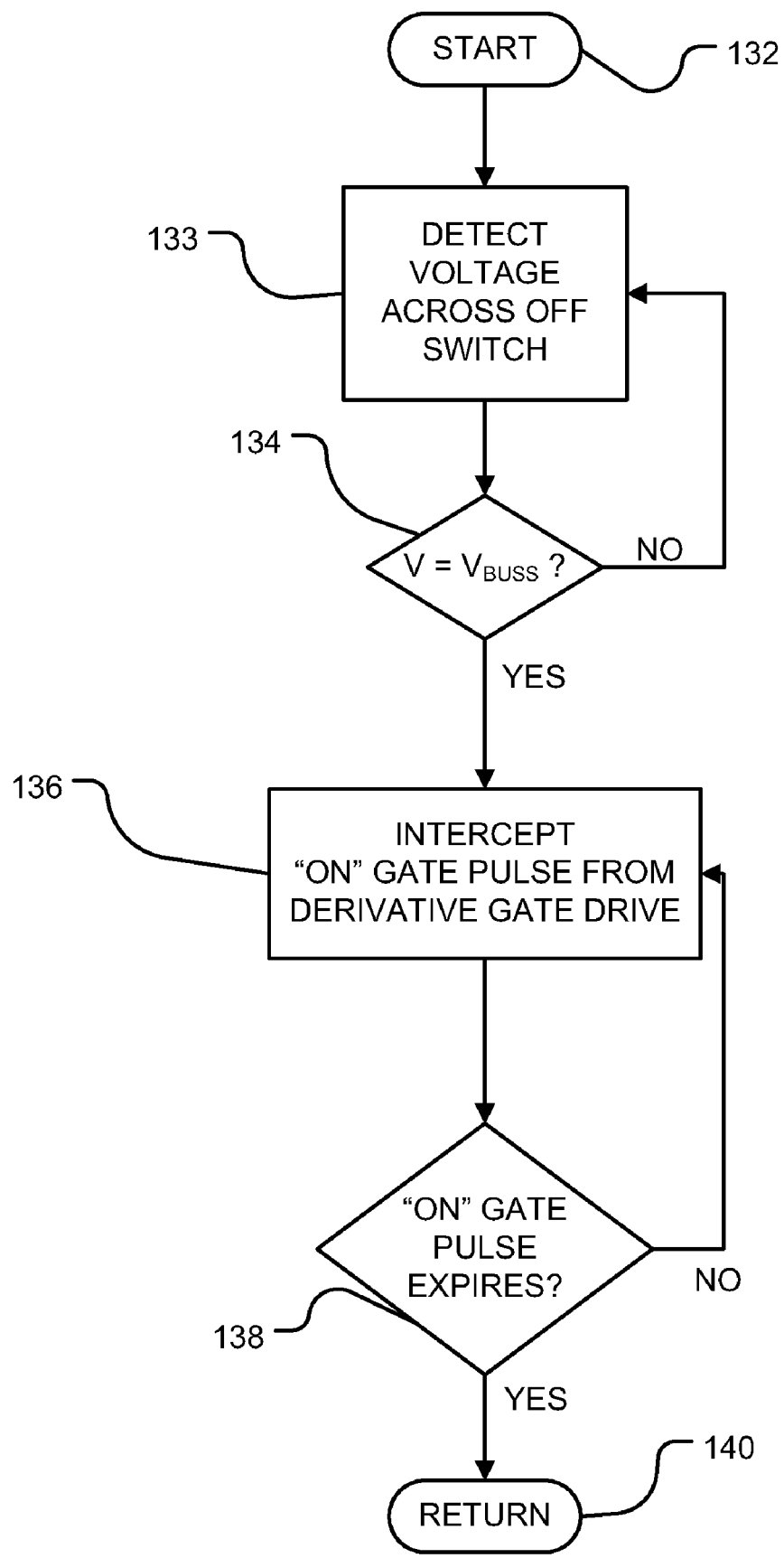
FIG. 7 illustrates a one embodiment of a method performed by the prevent module 128 in FIG. 6.
Figure 8:
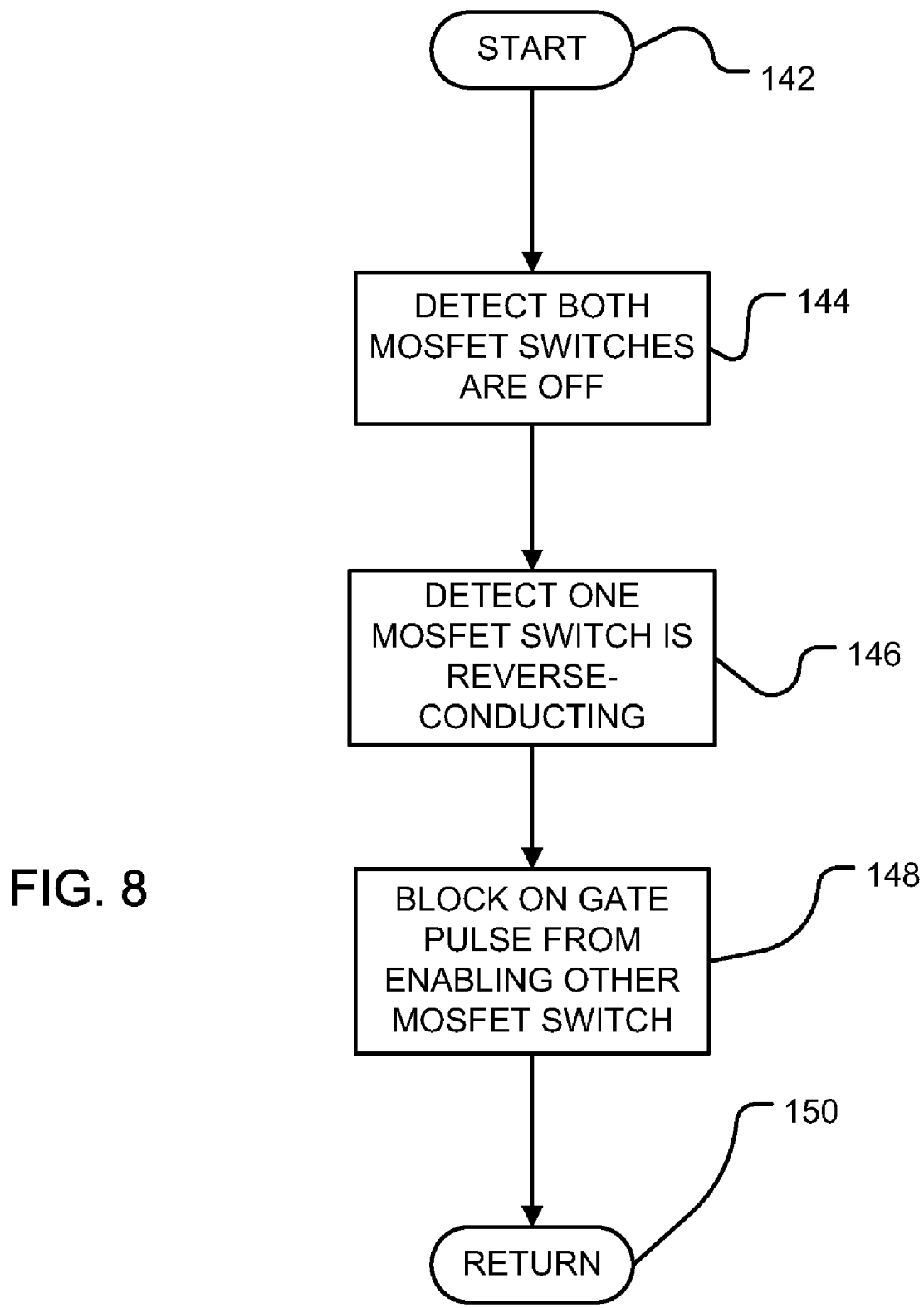
FIG. 8 illustrates another embodiment of a method performed by the prevent module 128 in FIG. 6.

In FIG. 7 the embodiment of a prevent module 128 (FIG. 6) begins at connector 132. Detect voltage operation 134 monitors the voltage across both power switches looking for a predetermined maximum voltage across one of the power switches. Detecting this predetermined maximum voltage across one of the power switches is an indicator that the other power switch is reverse-conducting through its intrinsic diode. For example in FIG. 3, when the intrinsic diode D1 of power switch S1 is conducting reverse current through S1, the voltage across S2 will be $+V_{BUSS}$. This is also true of power switch S1 when intrinsic diode D2 of power switch S2 is conducting reverse current through S2.

As described in FIG. 3 a maximum voltage (e.g., $+V_{BUSS}/n$, where n=1 . . . 20) across a non-conducting switch is a condition where that switch should not be switched on. Accordingly test operation 134 will branch the operation flow YES to intercept operation 136 when the voltage monitored by detect operation 134 reaches $+V_{BUSS}/n$. Intercept operation 136 intercepts the ON gate pulse from the derivative gate drive to prevent that pulse from reaching the non-conducting switch. If the voltage monitored by detect operation is not $+V_{BUSS}/n$, the operation flow branches NO from test operation 134 back to detect operation 134.

When intercept operation 136 is activated to intercept the ON gate pulse, it will continue to do so from the time $+V_{BUSS}$ is detected until the ON gate pulse expires. The expiration of the ON gate pulse is detected by expire test operation 138. So long as the gate pulse has not expired, the operation flow will branch NO from expire test operation back to intercept operation 136. When the expiration of the gate pulse is detected by expire test operation 138, the operation flow branches YES from expire test operation 138 to RETURN connector 140. This completes the operational flow of one embodiment of prevent module 128 in FIG. 6.

FIG. 8 shows the operational flow for another embodiment of prevent module 128. After the start connector 142, OFF detect operation 144 is monitoring both MOSFET switches to detect if they are both OFF. Reverse-conducting detect operation 146 is also monitoring both MOSFET switches to detect if one of the OFF switches is reverse conducting current. In other words, it is detecting conduction by an intrinsic diode in one of the switches. After both detect operations are completed, block operations 148 blocks the ON gate pulse from reaching the gate of the MOSFET switch that is not reverse conducting. As described above in the other embodiments this protects the intrinsic diode in the MOSFET that is reverse conducting.

Figure 9:
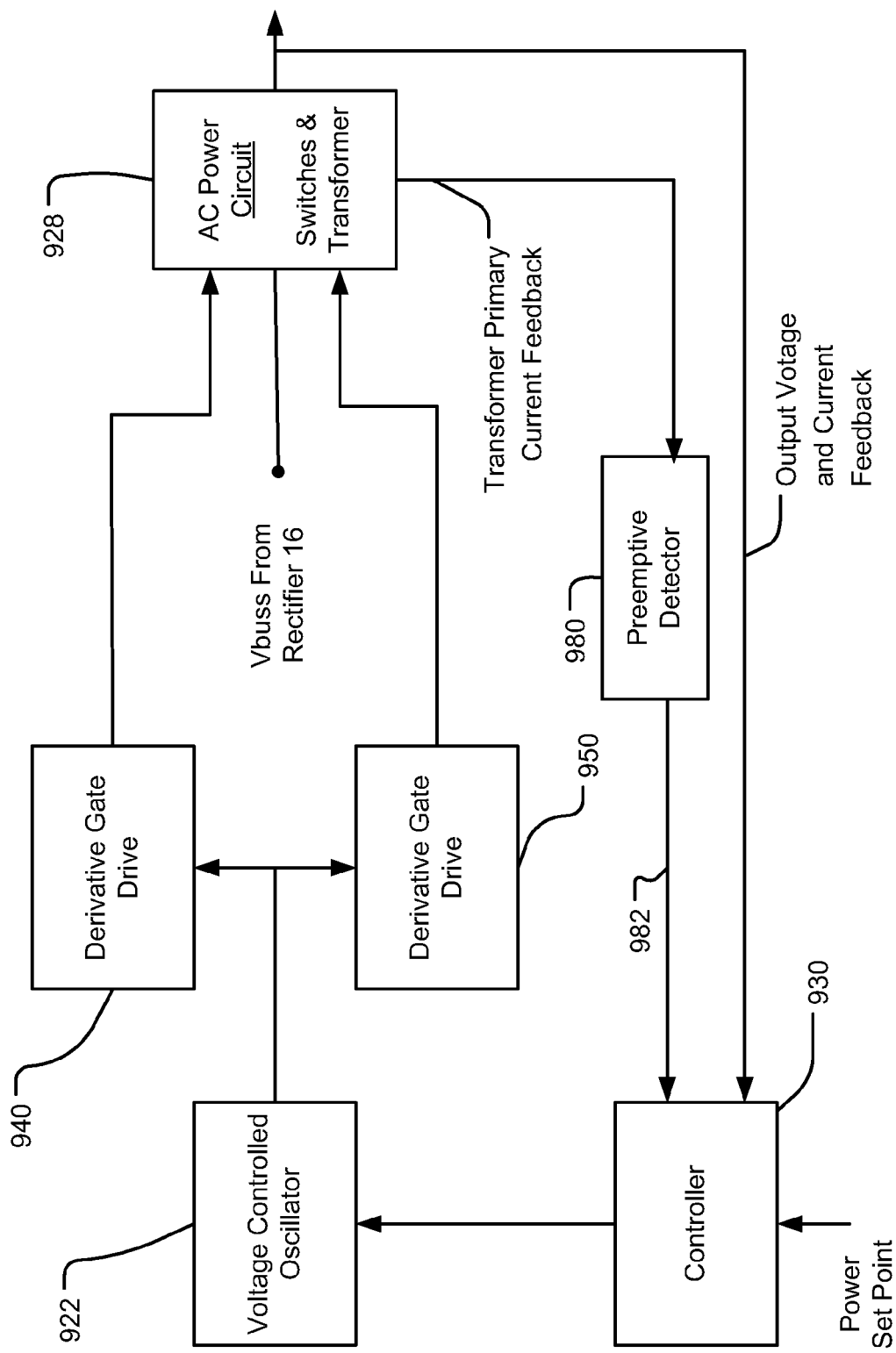
FIG. 9 is a block diagram depicting another embodiment of the invention.

Referring next to FIG. 9, shown is a block diagram depicting another embodiment of the power converter 18 depicted in FIG. 1. As shown, this embodiment includes similar components to the components described with reference to FIG. 2, but unlike the embodiment of the power converter depicted in FIG. 2, in this embodiment, protection circuits 42, 52 are not employed and a preemptive detector 980 is disposed between the feedback from the primary transformer and controller 930.

The preemptive detector 980 in this embodiment generally operates to anticipate a zero crossing of the primary current of the transformer before any zero-crossing occurs. And in response to an anticipated zero-crossing, the preemptive detector 980 provides a control signal 982 to the controller 930, which operates in this embodiment to control the VCO 922 so as to preempt a below resonance condition from occurring.

More specifically, the controller 930 in this embodiment takes over frequency control and the VCO 930 becomes a slave of the controller 930; thus the controller 930 may prompt the VCO to move to the next cycle so that the state of the switches (e.g., switches S1, S2 depicted in FIG. 3) are changed before transformer current ITR zero crossovers occur.

As a consequence, the conditions that occur during a below resonance condition (e.g., ON gate pulses to the switches are late relative to the transformer current $I_{TR}$ zero crossovers) are prevented from occurring in the first place, which may obviate the need for the protection circuits 42, 52.

Figure 10:
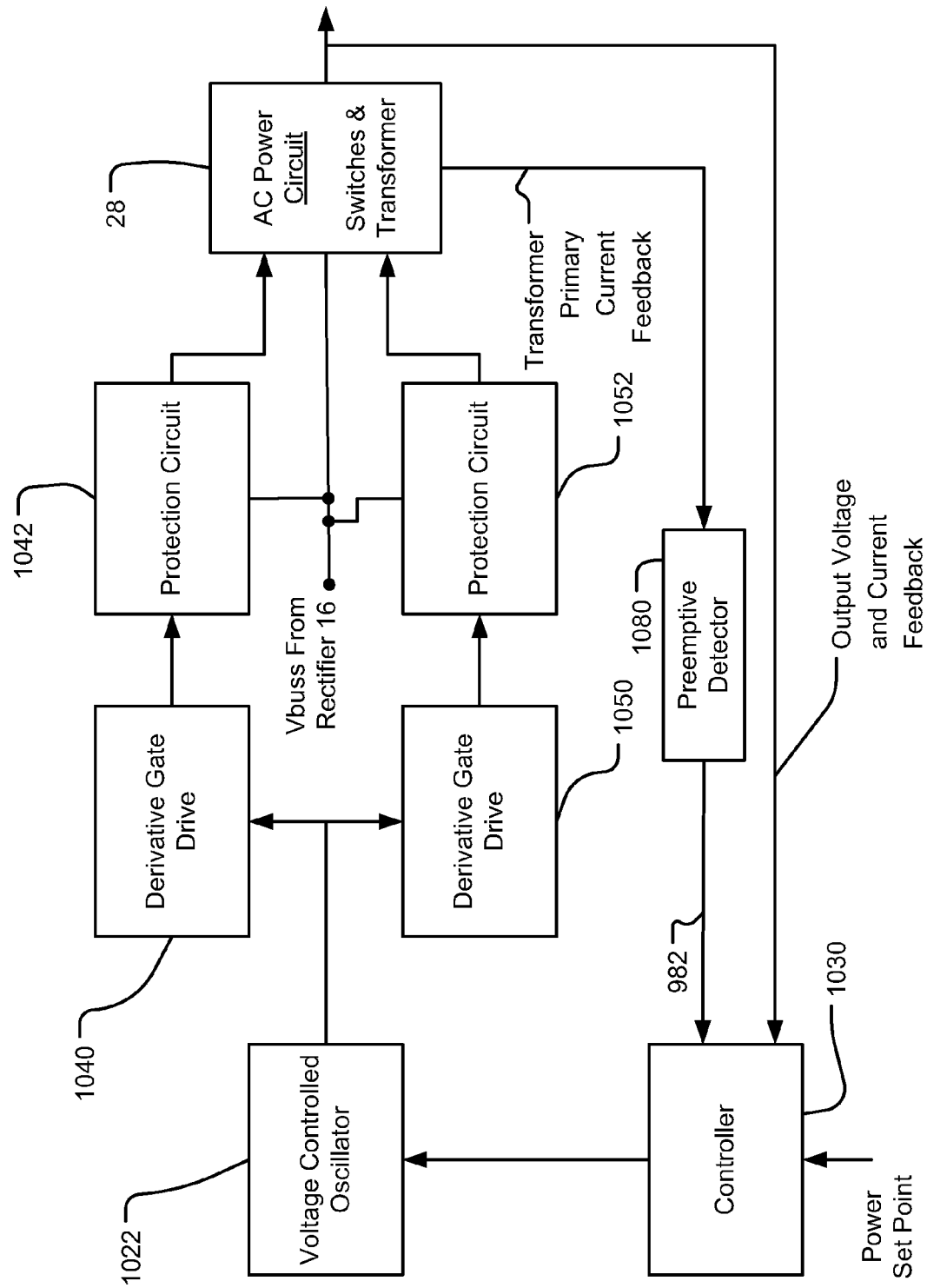
FIG. 10 is a block diagram depicting yet another embodiment of the invention.

Referring next to FIG. 10, shown is a block diagram depicting another embodiment of the power converter 18 depicted in FIG. 1. As shown, in this embodiment both a preemptive detector 1080 and protection circuits 1042, 1052 are employed. The preemptive detector 1080 in this embodiment generally operates in the same manner as the preemptive detector 980 described with reference to FIG. 9 to help prevent a below resonance condition from occurring. But if a below resonance condition does occur, protection circuits 1042, 1052 operate to mitigate or prevent damage to the switches (e.g., in much the same way as protection circuits 42, 52 protected switches S1, S2 as described with reference to FIGS. 2 and 3.

In operation, it is contemplated that the preemptive detector 1080 prevents a below resonant condition from occurring in the first place, but under extreme conditions (e.g., ITR noise prevents proper operation of the preemptive detector 1080) a below resonance condition may occur notwithstanding the preemptive detector 1080. In these extreme conditions, the protection circuits 1042, 1052 help to prevent damage to AC power circuits 28.

Figure 11:
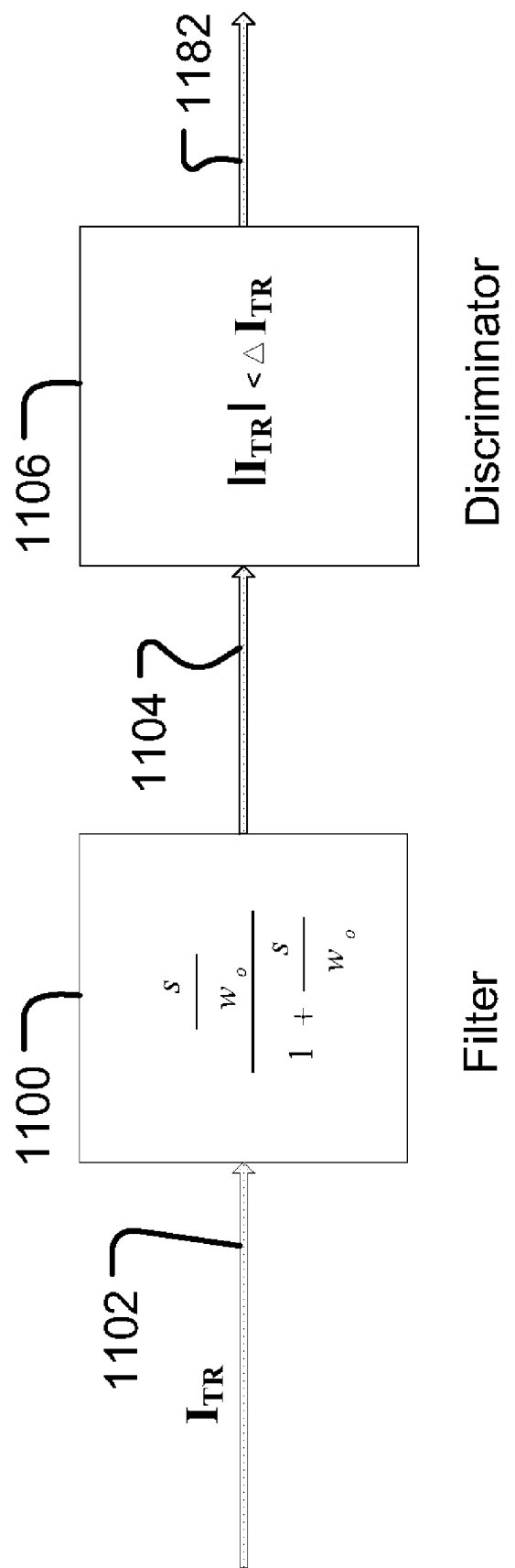
FIG. 11 is a block diagram depicting functional components of an exemplary preemptive detector.

Referring next to FIG. 11, shown is a block diagram depicting functional components of a preemptive detector, which may be implemented as the preemptive detectors 980, 1080 described with reference to FIGS. 9 and 10, respectively. As shown, in this embodiment a filter 1100 is coupled to receive an input 1102 indicative of the current $I_{TR}$ flowing through the primary winding (e.g., primary winding 46a) of an output transformer and provide a filtered output 1104 to a discriminator 1106 (e.g., a window discriminator), which provides a preemptive-control-signal 1182 (e.g., to controller 930, 1030). In one embodiment, the signal 1102 is maintained in the analog domain and is processed by the filter 1100 and discriminator 1106 in analog form. In another embodiment the signal from the may be digitized (e.g., by a 20-40 Mhz converter) and the filter 1100 and discriminator 1106 may be realized by digital components.

In operation, current following through the primary of an output transformer is sensed (e.g., with a current transducer) and converted to the input signal 1102 (e.g., a voltage that is indicative of current $I_{TR}$), which is generally sinusoidal, but the input signal 1102 may often have noise and other imperfections. The filter 1100 in this embodiment adds a differential portion to the existing sinusoidal input signal 1102 to create a phase shift into the future so as to allow detection of the zero crossing before it happens. In one embodiment for example, the filter 1100 creates a phase shift of 90 degrees towards the future.

In addition, in many variations of this embodiment, the filter 1100 includes a high pass filter so that the phase shifted signal is limited with a filter frequency in a range that is slightly below the frequency of $I_{TR}$. In this way, distortions that may interfere with the detection of the zero-crossings of $I_{TR}$ are filtered out.

The discriminator 1106 in this embodiment then receives the signal 1104 (e.g., a time-shifted and filtered version of signal 1102) and provides an output 1182 if the signal 1104 crosses a window that is defined by a positive and negative value. For example, the first time the signal 1104 crosses the window boundary defined by the negative value from the bottom or crosses the window boundary from the top that is defined by a positive value, it is assumed that a zero crossing has occurred, and the output 1182 of the discriminator 1106 will change state so as to initiate as state change of the switches (e.g., switches S1, S2) before a zero crossing in $I_{TR}$ has actually occurred.

Figure 12:
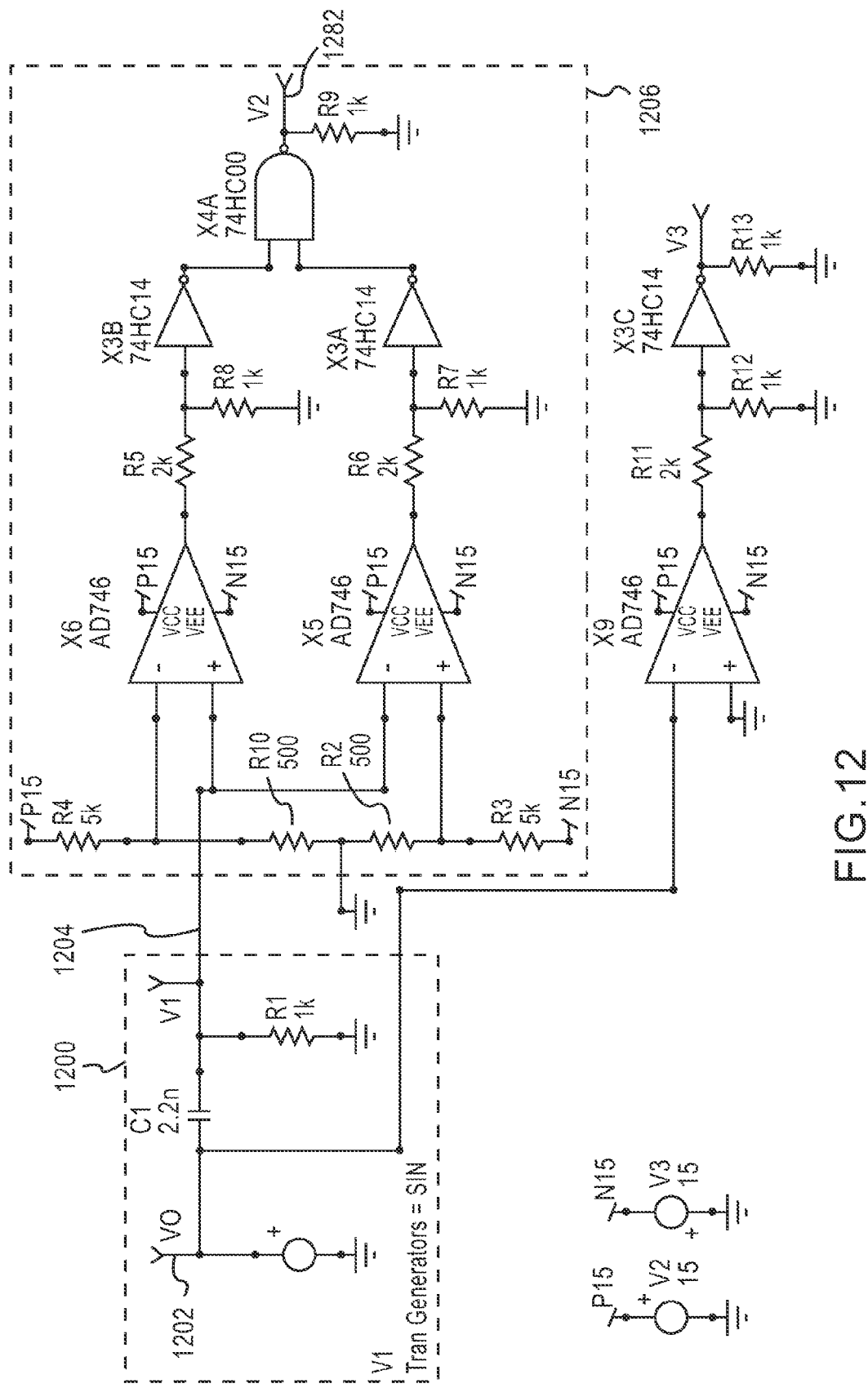
FIG. 12 is a schematic view of another exemplary preemptive detector.
Figure 13:
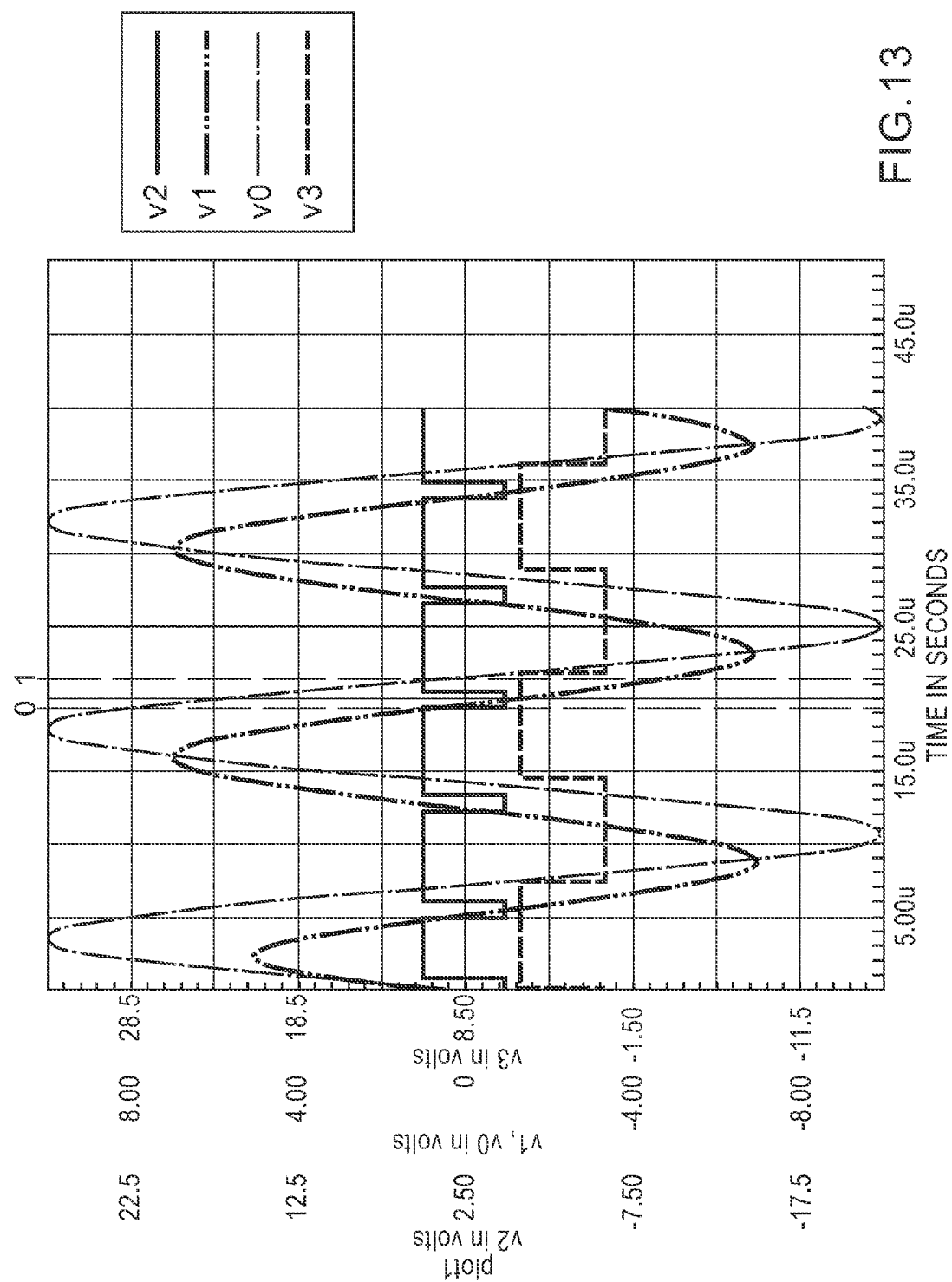
FIG. 13 is a graph depicting operating characteristics of the preemptive detector depicted in FIG. 12.

Referring next to FIGS. 12 and 13, depicted are a schematic view of an exemplary preemptive detector and a graph, respectively, depicting operating characteristics of the preemptive detector. As shown, the preemptive detector depicted in FIG. 12 includes a high pass filter portion 1200 that includes an input 1202 disposed to couple to a voltage $V_0$ (e.g., applied by a current transducer (not shown)) that is indicative of current generated by a power converter (e.g., power converter 18). Also depicted is a signal 1204 output from the high pass filter portion 1200 that includes voltage $V_1$, which is time-shifted and filtered version of the signal $V_0$ applied to the input 1202 preemptive detector. Referring to FIG. 13 for example, the voltage $V_1$ is a time shifted so that the zero crossings of voltage $V_1$ occur approximately two microseconds before the corresponding zero crossings of the voltage $V_0$; thus enabling each zero crossing to be predicted with enough time in advance to change the state of power switches (e.g., switches S1, S2) before the zero crossing occurs.

Also depicted in FIG. 12 is a window discriminator 1206, which is coupled to the high pass filter 1200 to receive the signal 1204 that is output from the filter 1200. As depicted, the window discriminator 1206 is configured to provide an output $V_2$ that changes state responsive to the signal 1204 approaching a zero crossing. As shown in FIG. 13, for example, as $V_1$ crosses approximately +/−1 Volt from either a positive or negative direction, the output $V_2$ changes state from a positive value to a negative value; thus providing an indication to the controller 930, 1030 that a zero crossing is about to occur. And responsive to the output 1282 of the preemptive detector, the controller 930, 1030 prompts the VCO 922, 1022 to move to the next cycle so as to help prevent a below resonance condition from occurring.

Figure 14:
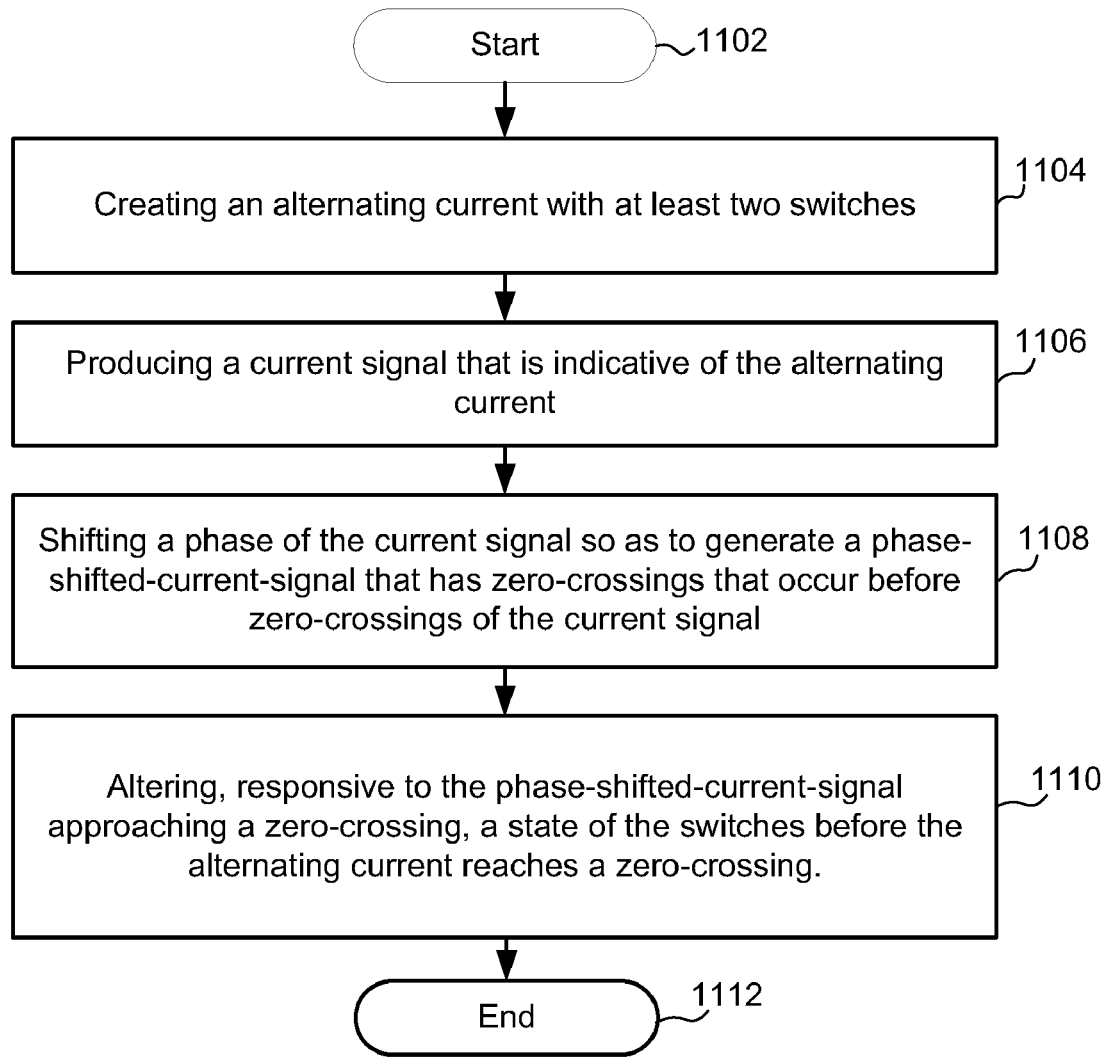
FIG. 14 is a flowchart depicting an exemplary method that may be carried out in connection with the embodiments described with reference to FIGS. 9-13.

Referring next to FIG. 14, shown is a flowchart depicting an exemplary method that may be carried out in connection with the embodiments described with reference to FIGS. 9-13. As shown, an alternating current is created with at least two switches (e.g., switches S1, S2 described with reference to FIG. 3) (Blocks 1102, 1104). A current signal is produced that is indicative of the alternating current (Block 1106). In many embodiments, for example, a current transducer is utilized to sense the alternating current that is created with the switches, and to generate the current signal as a voltage that is proportional to the alternating current.

As shown in FIG. 14, the current signal is shifted in phase so as to generate a phase-shifted current signal that has zero-crossings that occur before zero-crossings of the current signal (Block 1108), and responsive to the phase-shifted-current-signal approaching a zero-crossing, a state of the switches is altered before the alternating current reaches a zero-crossing (Blocks 1110, 1112).

While the invention has been particularly shown and described with reference to multiple embodiments thereof, it will be understood by those skilled in the art that various other changes in the form and details may be made therein without departing form the spirit and scope of the invention.

What is claimed is:

1. A power conversion apparatus, comprising:
   switching components configured to create an alternating current;
   a preemptive detector arranged and configured to provide, in advance of the alternating current reaching a zero-crossing, a control signal responsive to the alternating electrical current approaching the zero-crossing;
   a controller configured, at least in part, to change a state of the switching components before the zero crossing, in response to the control signal; and
   a gate signal disabler configured, in response to an intrinsic diode in a first of the switching components conducting transformer current, to block an ON gate pulse from reaching a second of the switching components so that the second switch is not turned ON while the intrinsic diode of the first switch is conducting.

2. The power conversion apparatus of claim 1, including: a voltage controlled oscillator, wherein the controller is configured to change a state of the switching components by controlling the voltage controlled oscillator.

3. The power conversion apparatus of claim 1, wherein the preemptive detector includes:
a filter arranged to receive a current signal indicative of the alternating current, the filter configured to create a phase shift in the current signal so as to create a phase-shifted-current-signal, the phase-shifted-current-signal indicating the alternating current is at a zero crossing before the alternating current is actually at a zero crossing.

4. The power conversion apparatus of claim 3, wherein the preemptive detector includes:
a window discriminator arranged to receive the phase-shifted-current-signal, the window discriminator configured to provide the control signal responsive to the phase-shifted-current-signal crossing a threshold while moving in the direction of the zero crossing.

5. The power conversion apparatus of claim 3, wherein the filter includes a high pass filter with a filter frequency that is slightly below the frequency of the alternating current so as to filter out distortions that would interfere with detection of the zero-crossings.

6. The power conversion apparatus of claim 1, wherein the switching components are selected from the group consisting of MOSFETs, and IGBTs.

7. A method for converting power, comprising:
creating an alternating current with at least two switches;
producing a current signal that is indicative of the alternating current;
shifting a phase of the current signal so as to generate a phase-shifted-current-signal that has zero-crossings that occur before zero-crossings of the current signal; and
altering, responsive to the phase-shifted-current-signal approaching a zero-crossing, a state of the switches before the alternating current reaches a zero-crossing;
detecting an ON gate pulse event for a gate of one of the switches;
comparing a time of occurrence of the zero-crossing with a time of occurrence of the ON gate pulse event to determine if the ON gate pulse event occurs after the zero-crossing;
if the ON gate pulse event is after the zero-crossing, preventing another ON gate pulse from enabling a switch that is OFF;
and if the ON gate pulse is after the zero-crossing, advancing a controlled frequency of the switches until a subsequent pulse event precedes a subsequent zero-crossing.

8. The method of claim 7, including:
filtering the current signal with a filter frequency that is slightly below the frequency of the alternating current.

9. A power conversion apparatus, comprising:
means for creating an alternating current with at least two switches;
means for producing a current signal that is indicative of the alternating current;
means for shifting a phase of the current signal so as to generate a phase-shifted-current-signal that has zero-crossings that occur before zero-crossings of the current signal; and
means for altering, responsive to the phase-shifted-current-signal approaching a zero-crossing, a state of the switches before the alternating current reaches a zero-crossing,
means for detecting an ON gate pulse event for a gate of one of the switches;
means for comparing a time of occurrence of the zero-crossing with a time of occurrence of the ON gate pulse event to determine if the ON gate pulse event occurs after the zero-crossing; and
means for preventing another ON gate pulse from enabling a switch that is OFF if the ON gate pulse event is after the zero-crossing and if the ON gate pulse is after the zero-crossing, means for advancing a controlled frequency of the switches until a subsequent pulse event precedes a subsequent zero-crossing.

10. The power conversion apparatus of claim 9, including:
means for filtering the current signal with a filter frequency that is slightly below the frequency of the alternating current.

* * * * *